April 6, 1937.    L. OTTINGER    2,075,829
HANDLE AND LATCH MECHANISM
Filed Dec. 19, 1935    6 Sheets-Sheet 1

INVENTOR
Leon Ottinger
BY
Pennie, Davis, Marvin & Edmonds
his ATTORNEYS

April 6, 1937.  L. OTTINGER  2,075,829

HANDLE AND LATCH MECHANISM

Filed Dec. 19, 1935  6 Sheets-Sheet 2

INVENTOR
Leon Ottinger
BY
Pennie, Davis, Marvin and Edmonds
his ATTORNEYS

April 6, 1937.  L. OTTINGER  2,075,829

HANDLE AND LATCH MECHANISM

Filed Dec. 19, 1935  6 Sheets-Sheet 3

INVENTOR
*Leon Ottinger*
BY
*Pennie, Davis, Marvin & Edmonds*
his ATTORNEYS

April 6, 1937.  L. OTTINGER  2,075,829

HANDLE AND LATCH MECHANISM

Filed Dec. 19, 1935  6 Sheets-Sheet 4

INVENTOR
Leon Ottinger
BY
Pennie, Davis, Marvin & Edmonds
his ATTORNEYS

April 6, 1937.　　　　　L. OTTINGER　　　　　2,075,829
HANDLE AND LATCH MECHANISM
Filed Dec. 19, 1935　　　6 Sheets-Sheet 5

INVENTOR
Leon Ottinger
BY Pennie, Davis, Marvin & Edmonds
his ATTORNEY

April 6, 1937.  L. OTTINGER  2,075,829

HANDLE AND LATCH MECHANISM

Filed Dec. 19, 1935  6 Sheets-Sheet 6

INVENTOR
Leon Ottinger
BY Pennie, Davis, Marvin & Edwards
his ATTORNEYS

Reissued Apr. 6, 1937

2,075,829

UNITED STATES PATENT OFFICE 2,075,829

HANDLE AND LATCH MECHANISM

Leon Ottinger, New York, N. Y.

Application December 19, 1935, Serial No. 55,237

20 Claims. (Cl. 292—169)

My present invention relates to door handles and latch mechanisms, and, more particularly, it has to do with the arrangement of the handle and latch mechanism for use in connection with the doors of motor cars, airplanes and other objects made in accordance with the principles of streamline designing.

In the automobile industry, projecting door handles, constructed as they are at present, constitute a source of some danger, there having been recorded a number of instances where physical injury has been caused by the fact that the door handles projected a substantial distance from the surface of the car body. In addition to the question of safety, in order to conform to the requirements of streamline design, it is desirable to eliminate so far as possible all elements which project abruptly from the surface of the car body. This cannot be done merely by providing a deep recess in the surface of the door large enough to receive the present type of door handle and prevent it from projecting beyond the surface of the car body. Such a recess would interfere with the principles of streamlining as much or more than the present type of projecting handle. Moreover, it would be difficult to form such a recess in a way to avoid the collection of dust to such an extent as to soil the glove or the hand when opening the door.

One of the objects of my invention is to provide a handle and latch construction for doors, wherein the handle in normal position does not project objectionably beyond the principal surface of the door, nor require large recesses or depressions therein, but which, nevertheless, can be grasped and manipulated as readily as the ordinary projecting type of handle.

Another object of the invention is to coordinate the ornamental and utilitarian features of the door handle in such a way that the handle will blend with the ornamental design of the door, so that the handle will be comparatively inconspicuous and at the same time will satisfactorily perform its function as a handle for operating the latch and also for opening the door.

Another object of the invention is to provide a rotary door handle and latch mechanism which are particularly adapted for use on streamlined bodies, and especially to accomplish this without substantially increasing the thickness of the latch mechanism.

Another object of the invention is to provide a latch mechanism and door handle which can be mounted in position on the door very quickly, even when the door is made entirely of sheet metal, that is, of shell-like construction, and there is no guiding hole for the handle shaft.

Another object of the invention is to provide a handle which does not project substantially beyond the surface of the door, and which at the same time can be grasped and operated as readily as the ordinary projecting type of handle, but which does not involve complicated mechanism, and which can be employed without change, or with a minimum of change in the latch mechanisms which have become standardized with motor car manufacturers.

Although my improved handle and latch mechanism are adapted for general use on doors of various objects, drawers and like devices, the invention is illustrated, by way of example, in the accompanying drawings as a handle and latch for the door of an automobile. In these drawings.

Figure 1:
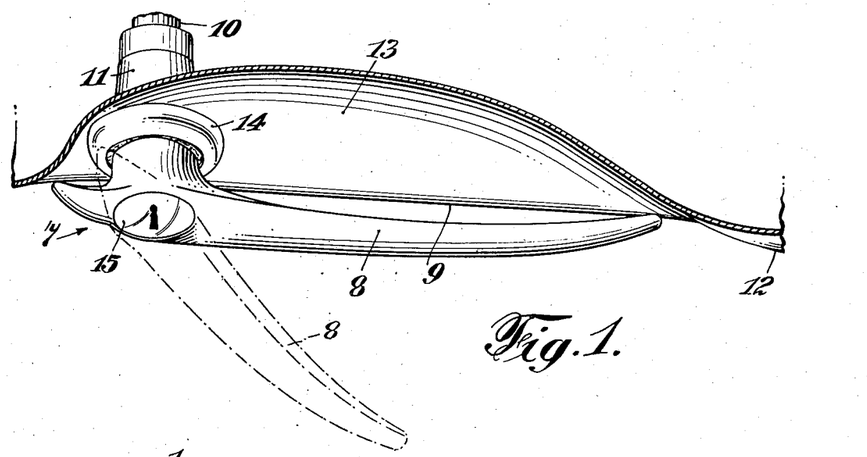
Fig. 1 represents a view partly in plan and partly in horizontal section on line 1—1 of Fig. 2, of a portion of the outer wall of a sheet metal door of an automobile to which one form of handle and latch mechanism, constructed in accordance with my invention, has been applied.
Figures 2, 5:
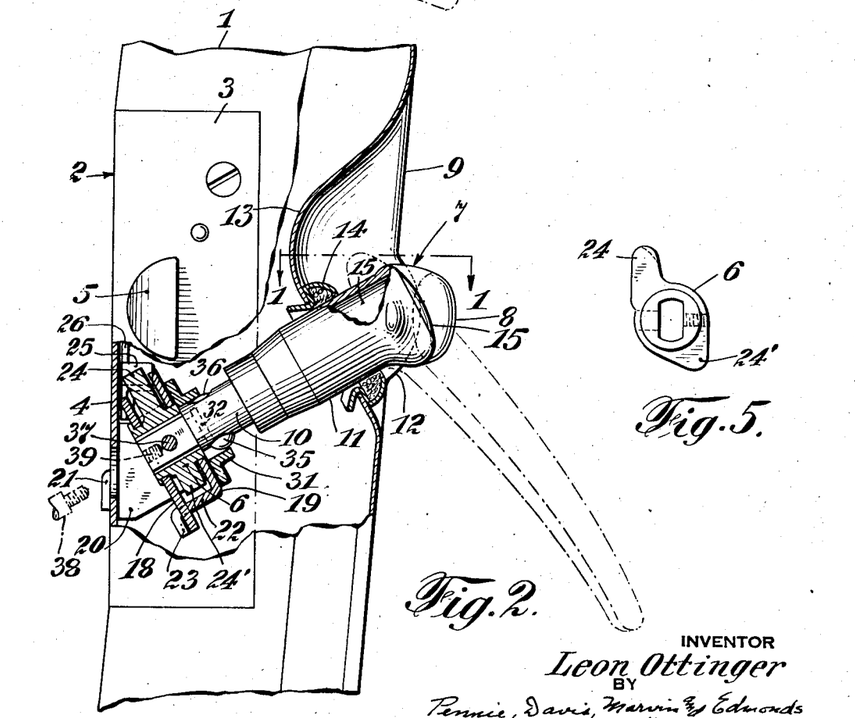
Fig. 2 represents a view in elevation looking at the edge of the door, this view being partly broken away so as to show a part of the latch mechanism in section taken vertically through the center of the shaft of the handle.
Fig. 5 represents a plan view of the roll-back used in the latch mechanism of Fig. 2.
Figure 3:
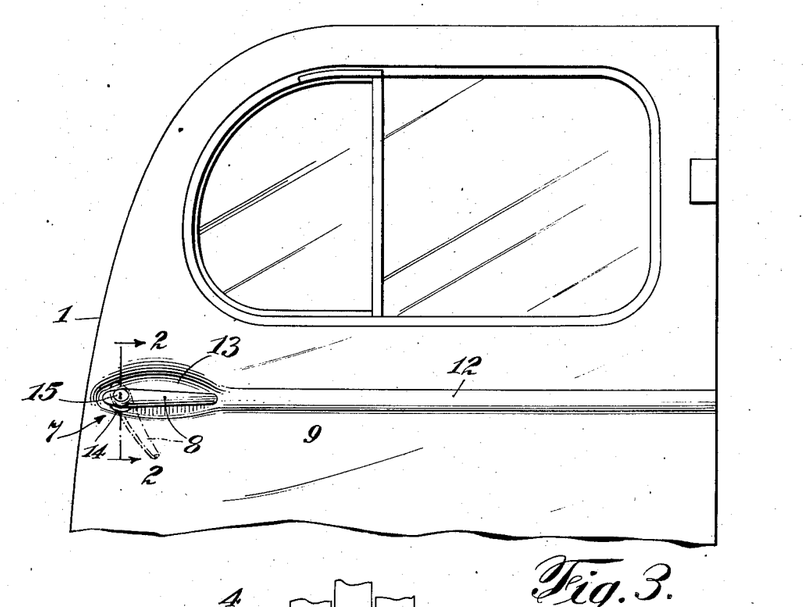
Fig. 3 represents a side view of the upper portion of a motor car door with my improved handle applied thereto.

Referring now to these drawings, and particularly to Figs. 1 to 4, the door 1, shown in edge view in Fig. 2 is provided with a latch mechanism indicated generally by numeral 2. This latch mechanism has a face plate 3 mounted flush with the edge of the door in the usual manner, and a base, or base plate, 4 mounted flush with the inner surface of the door. The latch bolt is shown at 5 and the roll-back at 6. A rotary handle, indicated generally by 7, is provided for retracting the latch bolt, and has a hand-grasp 8 which normally lies in general parallel relationship with the outer surface 9 of the door, as indicated in Fig. 1. In this position the hand-grasp is also arranged substantially horizontally, as shown in Fig. 3.

In accordance with my present invention, the spindle, or shaft, 10 which connects the shank 11 of the handle with the roll-back is arranged at a decided oblique angle both to the outer and inner surfaces or side faces of the door and the plane of the latch mechanism, instead of being substantially normal or perpendicular thereto, as is customary. In consequence of this angularity, when the handle, that is to say, the hand-grasp 8 thereof, is grasped by the hand and force applied thereto in a downward direction in a plane parallel with the face 9 of the door, the outer end of the hand-grasp will swing away from the door face in an arcuate path at an angle relative to the direction in which the manual pressure was applied, and to the position shown in dot-and-dash lines in Fig. 3. As the hand-grasp 8 is moved to the dot-and-dash line position of Fig. 3, the shaft 10 will be rotated in a clockwise direction and the latch bolt 5 retracted so that the door may be opened. The movement of the hand-grasp 8 away from the surface 9 of the door is rapid as indicated by the dot and dash line position shown in Figs. 1 and 2. Such a handle can be so mounted that in its normal horizontal position it lies extremely close to the surface of the door and to all intents and purposes is flush with this surface; or if a decorative device, such as the bead 12 shown at Fig. 3 is used, the handle can be made to lie substantially in alinement with the bead, and in either case the handle does not substantially interfere with streamline flow over the surface of the car body.

The degree of inclination of the shaft 10 may vary as required on different door structures, the determining factor being that the free end of the hand-grasp 8 will move outwardly and sufficiently well away from the door face to enable the hand-grasp to be grasped and easily operated.

Even though the handle is mounted close to the surface of the door, this does not interfere with manipulation. The fingers slip easily around the handle and impart the initial movement to it, the fingers sliding gradually over the handle as the handle moves out away from the door, so that the hand has a firm, comfortable grasp on the handle as the handle reaches the position where considerable pressure is necessary in order to overcome the latch bolt actuating spring so as to throw back the bolt and open the door.

In Fig. 2, as in other similar figures of the drawings, the inner and outer surfaces of the door and of the latch mechanism are positioned as in an actual car door construction. It will be noted that the inclination of the outer surface 9 is such as to favor the angular inclination of the handle shaft in swinging the hand-grasp away from the door as it is turned. Similarly, as may be seen from Fig. 1, and other similar figures, the outward bulge of the car body, as shown by the curving surface 9, also aids in enabling the hand-grasp to move rapidly away from the body.

If desired, the surface 9 of the door may be recessed, or dished, as shown at 13 in order to provide greater freedom for the entry of the fingers on the inside of the hand-grasp 8. This recess may be made to conform to the ornamental design of the door, and, as shown in Fig. 3, forms a termination for the decorative bead 12. On account of the angularity of shaft 10, and the resulting outward movement imparted to the door handle, which enables the handle in normal position to be extremely close to the surface of the door, recess 13 may be made so shallow as not substantially to interfere with streamline flow over the body.

Recess 13 may also be provided for the additional reason that it enables shank 11 of the door handle to be brought through a circular hole in the outer wall of the sheet metal door, and in this way, a standard circular escutcheon, or collar, 14 may be used, thus avoiding the expense of tooling up for the manufacture of an escutcheon of special form. For this reason, the lower surface of recess 13 adjacent shank 11 of the handle is made substantially flat and at an angle which, as shown in Fig. 2, is normal to the shank. The entire lower surface of recess 13 preferably has about this same pitch, since the surface of the recess is thus made so steep that dust and water cannot collect therein, which might have a tendency to soil the fingers or the gloves.

When desired, my improved handle may be provided with the usual cylinder type of lock indicated by reference numeral 15, which is received within the outer end of shank 11. The portion of the handle immediately adjacent the keyhole end of lock 15 is preferably made about at right angles to the axis of the shank, as shown in Fig. 2, but the remainder of the handle, including the hand-grasp 8, is arranged so as to be approximately at right angles to the surface 9 of the door.

Figure 4:
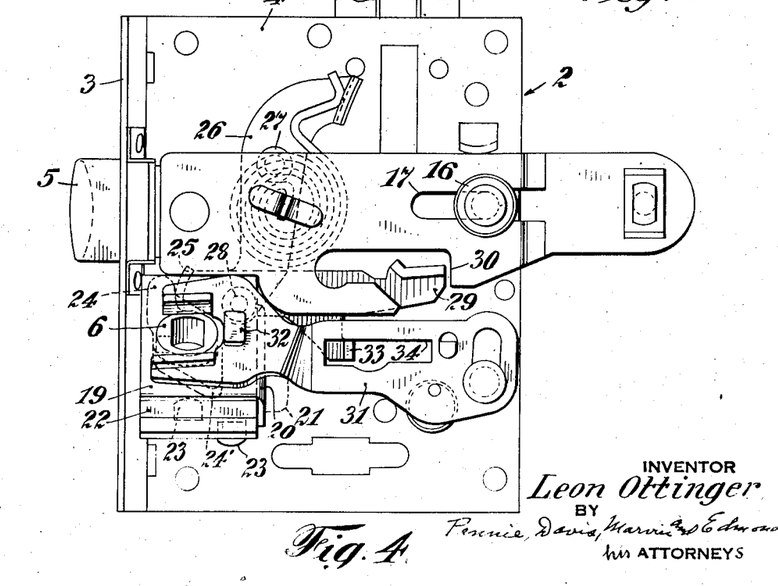
Fig. 4 represents a view in elevation of a latch and locking mechanism.

My invention also includes simple modifications of latch mechanism 2 to adapt it to be actuated by the angular shaft 10 instead of by a shaft which projects at right angles from the latch mechanism. In Fig. 4 there are shown some of the details of a desirable form of latch mechanism, with certain parts thereof which are drawn in heavy lines, modified somewhat to receive the angular shaft 10 of Fig. 2. This general form of latch mechanism may conveniently be employed in connection with the other modifications of my invention illustrated in the subsequent figures of the drawings, in certain of which figures, other arrangements for adapting the latch mechanism for cooperation with an angular handle shaft are illustrated. It will be understood, however, that aside from the changes in the latch mechanism which I have devised for adapting it for cooperation with the angular handle shaft, the general form of the latch mechanism can be changed as desired without departing from the spirit of my invention.

In the latch mechanism illustrated in Fig. 4, bolt 5 slides through the usual aperture in face plate 3, and is suitably guided near its opposite end for rectilinear sliding movement. The limits of this movement are determined by means of a post 16 anchored to base plate 4 and the opposite ends of a slot 17 through which this post projects. The usual remote control means may be connected to the right hand end of the bolt. Beneath and adjacent the front end of bolt 5, I have arranged two angularly positioned roll-back bearing plates 18 and 19, having apertures therein which form the journals for the roll-back 6. The inner bearing plate 18 is attached at one end to face plate 3, and at the opposite end is supported by an integral foot member 20 having a projection 21 which passes through a slot in base 4 and is bent over flat against the outside of this plate. The outer roll-back bearing plate 19 is mounted upon the inner plate 18, as, for example, by means of the supporting member 22 and projection 23 which passes through a slot in member 18 and is bent flat against the under surface thereof.

The end of handle shaft 10 is slabbed in the usual manner so as to be received within the flat sided aperture of roll-back 6 so that positive rotation is given to the roll-back by turning handle 7. Roll-back 6 is of the usual form, having a nose 24 and a stop lug 24'. Nose 24 coacts with a lug 25 formed near the lower end of a dog-carrier lever 26 which is pivoted to base 4 at 27. The lower end of dog-carrier 26 is provided with a pivot 28 by means of which a bolt-actuating dog 29 is attached thereto. The left hand end of dog 29 preferably extends into close proximity to lug 25 in order to reenforce the same.

When handle 7 is turned in the clockwise direction, as above described, nose 24 of roll-back 6 also turns in a clockwise direction, as shown in Fig. 4 thereby forcing actuating dog 29 to the right. As soon as the lost motion between the right hand end of dog 29 and of shoulder 30 on latch bolt 5 is taken up, the retracting of the latch bolt commences, and continued turning of the handle forces the latch bolt to the right until it is released from the door casing, after which the door may be opened.

The latch mechanism shown in Fig. 4 is of the type wherein the latch bolt is locked by operatively disconnecting the door handle therefrom so that when the door is locked the handle may be turned freely, but cannot retract the bolt. For this purpose there is arranged below and parallel to the bolt 5 a dog shifting lever 31 which is pivoted on a pin 32 fixed to the upper surface of outer roll-back bearing plate 19 and which has a rectangular head, as shown in Fig. 4. Dog-shifter 31 is actuated in the usual manner by the turning of the key in lock 15, as will be presently described. Its function is to operatively connect and disconnect the door handle and the latch bolt, by shifting the right hand end of dog 29 downwardly so that it will be held free of shoulder 30, and thereby is prevented from retracting latch bolt 5, should the door handle be turned. This shifting of dog 29 by shifter 31 is accomplished by means of a nose 33 formed on dog 29 which projects into a slot 34 in dog shifter 31.

The actuation of the left hand end of dog shifter 31, when the key in cylinder lock 15 is turned, is caused by a pair of balls 35 and 36 which are positioned within handle shaft 10 and coact with the left hand forked end of dog shifter 31. When the key is turned in one direction, ball 35 is projected and ball 36 retracted, thereby moving dog shifter 31 so as to place the latch mechanism in "unlocked" position, that is, with actuating dog 29 in the position shown in Fig. 4. When the key is turned in the opposite direction, ball 36 is projected and ball 35 retracted, thereby causing the parts to be moved to the locked position as above described.

Inasmuch as dog shifter 31 is pivoted on roll-back bearing plate 19, it rotates in the plane of this plate, and I have formed shifter 31 with a twist, shown in Fig. 4, so as to bring its right hand portion close to base 4 in order to avoid lengthening nose 33 excessively.

The coiled spring shown in Fig. 4 is mounted in the customary manner so as to serve both as the spring for normally holding latch bolt 5 in its outward position, and also for urging the lower end of dog-carrier lever 26 to the left so as to keep the several parts of the latch mechanism in engagement and prevent rattling, and also for the purpose of holding the hand-grasp 8 in horizontal position.

In assembling latch mechanisms and door handles on automobile doors, the customary practice is to first apply and secure the latch mechanism in place on the inside of the door, as shown, for example, in Fig. 2, and then to insert the handle through the escutcheon, or bushing, 14. In most motor car doors, as heretofore constructed, however, the pillars at the edge of the door where the lock was placed, have been made of wood. There is, therefore, a continuous hole through this wooden pillar which serves as a guide as the end of handle, shaft 10 is inserted through bushing 12 guiding the shaft and the shank until the slabbed end of shaft 10 is directed into the aperture in the roll-back.

On account of this guiding action of the walls of the hole, it is not difficult to get the end of the shaft to enter the roll-back, after which a holding screw, usually tapered, as indicated in cross section at 37 in Fig. 2, is put in place through a small aperture in face plate 3 provided for this purpose. With doors constructed entirely of sheet metal, however, and having no wooden corner pillars, which is the present tendency in door design, there is no guiding hole, and some little time is consumed in getting the end of shaft 10 into alinement with and into the aperture in the roll-back. In order to facilitate this, I provide a small, comparatively stiff rod, indicated at 38, the end of which is threaded, and I also provide a correspondingly threaded hole 39 in the end of shaft 10.

In assembling the parts in accordance with my invention, the latch 2 is first secured in place on the door. Then rod 38 is projected through the usual aperture in base plate 4 opposite the roll-back, thence through the roll-back itself, and thence through bushing 14. The handle is then held with the end of handle shaft 10 opposite the bushing and rod 38 is screwed into threaded aperture 39. Rod 38 is then used as a guide to lead the end of shaft 10 into the aperture in the roll-back. After this, screw 37 is put in place and rod 38 is unscrewed and removed. In this way, the parts of the handle and latch mechanism can be assembled in an instant and all delay in "fishing" with the end of handle shaft 10 to find the hole in the roll-back is eliminated.

Referring now to Figs. 6 to 12, inclusive, here is illustrated a modified form of latch mechanism which I have devised to be actuated by a door handle having an angular shaft, and for the purpose of making the latch mechanism as thin as possible. This is important for the reason that motor car doors are necessarily of limited thickness, and if the latch mechanism is too thick, it will interfere with the window mounting or with the movement of the window, and it also would weaken the pillars.

In this form of latch mechanism, instead of providing an inner roll-back bearing plate which is separate and spaced inwardly from the base plate 4a, as in Fig. 2, the base plate 4a is so formed as to provide a portion 40 at right angles to the axis of handle shaft 10a and which constitutes the inner bearing plate of roll-back 6a. In order to make the latch mechanism as thin as possible, roll-back bearing plate 40 is raised up from a depression, or recess, 41 formed in base 4a. The outer roll-back bearing plate 42 is shown in Fig. 10 and is secured in place in spaced, parallel relation with bearing plate 40 by means of a lug 43 which projects into a slot 44 in face plate 3a, and by means of a projection 45 which passes through a slot 46 in base 4a and is bent flat against the outside surface thereof.

Figures 6, 7, 8, 9, 10, 11, 12:
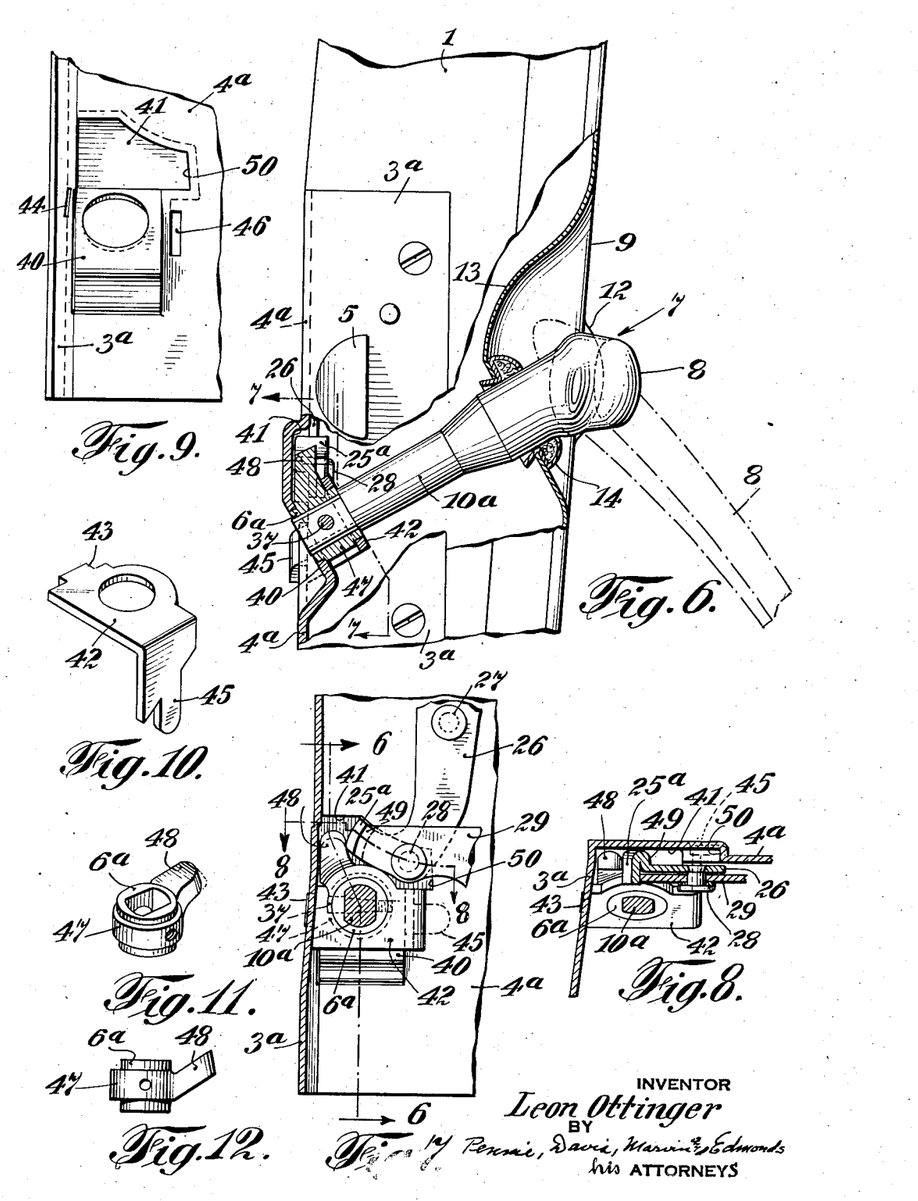
Fig. 6 represents a view similar to Fig. 2 of another form of handle and latch construction of my invention.
Fig. 7 represents a vertical transverse section taken on broken line 7—7 of Fig. 6.
Fig. 8 represents a horizontal section taken on broken line 8—8 of Fig. 7.
Fig. 9 represents a fragmentary view in side elevation looking from the right in Fig. 6 of the frame of the latch with the operating mechanism removed.
Fig. 10 represents a perspective view of a part of the latch mechanism.
Figs. 11 and 12 are views of the roll-back used with the form of latch mechanism shown in Figs. 6 and 7.

As a further means of reducing the thickness of the latch mechanism, a special form of roll-back is provided, as shown at 47 in Figs. 11 and 12. The actuating nose 48 of this roll back is angularly arranged, as shown, instead of being perpendicular to the axis of shaft 10, and this enables the roll-back to be positioned as far to the left as possible, as shown in Fig. 6, in contact with bearing plate 40. Roll-back 41 is also not provided with a stop projection to limit the turning movement of the door handle, as this stop is provided in another way, as will presently appear.

With the handle shaft arranged angularly in accordance with the invention, it is necessary for the nose 24 of the roll-back shown in Fig. 2, or the nose 48 of the roll-back shown in Fig. 6, to slide laterally of the surface of its coacting lug, and in the form of my invention shown in Figs. 6 to 12, inclusive, the dog carrier lug is widened to accommodate this sliding movement without increasing the thickness of the latch mechanism.

This widened lug 25a is formed as shown in Fig. 8 by upsetting the tail of dog-carrier 26 so as to form a portion 49 which projects outwardly into recess 41. This projecting portion 49 engages the end 50 of recess 41 which forms a shoulder to stop, or limit, the movement of the parts when the handle is turned to release the latch bolt.

Figure 13:
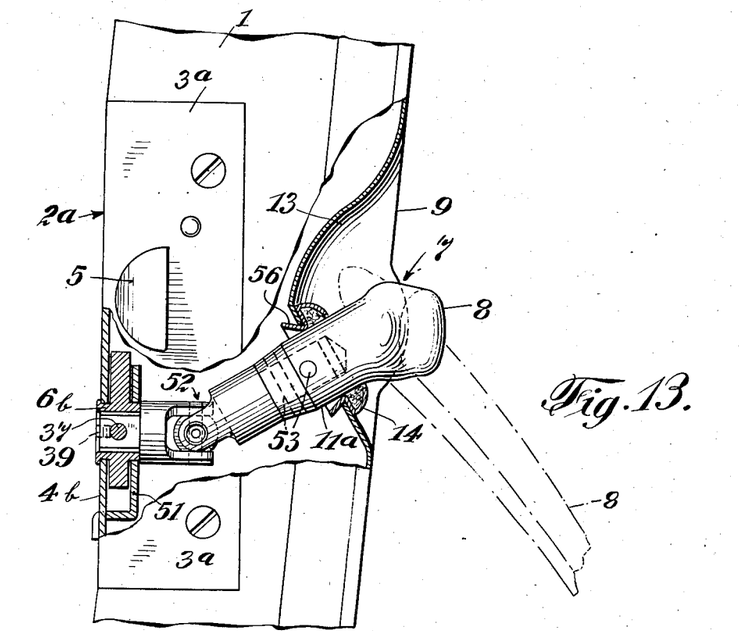
Fig. 13 represents a view similar to Fig. 2 of another modification.
Figure 14:
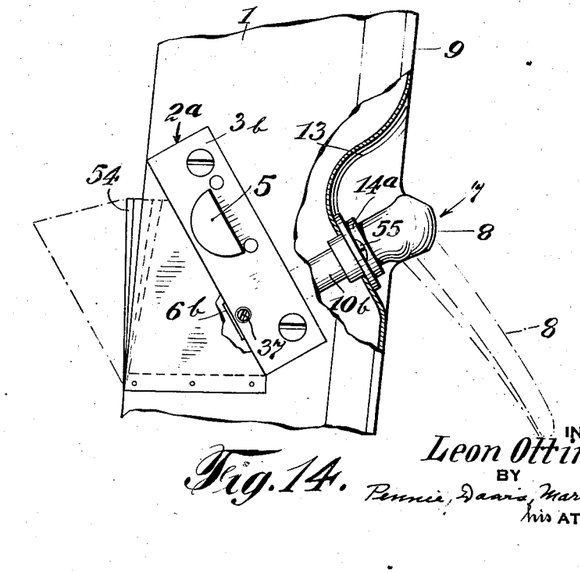
Fig. 14 represents a view similar to Fig. 2 of another modification.

In the forms of the invention illustrated in Figs. 13 and 14, no change whatever in the latch mechanism is necessary in order to accommodate the angularity of the handle shaft. In Fig. 13, latch mechanism 2a is a standard latch mechanism in which the roll-back 6b is mounted in the usual way between the base 4b and an inner bearing plate 51 mounted parallel therewith in the usual manner. In order to connect the inner end of the angular handle shaft with the roll-back 6b, the axis of which is horizontal, a universal joint 52 is provided. The outer member of the universal joint may be tapped or plugged directly into the shank 11a of the handle, and secured against turning by means of a pin 53. The opposite member of the universal joint is provided with a shoulder which fits against the roll-back and also with a flattened end of proper configuration to be received within the roll-back aperture. It is secured there by the usual threaded pin 37, shown in section in Fig. 13 and in dotted side view in Fig. 7. The same pin is also illustrated in Fig. 14 where the aperture in face plate 3b through which the head of the screw is accessible may be seen.

In assembling the latch mechanism and handle of this form of the invention, it is entirely impossible to control the position of the lower member of the universal joint by means of the handle. That is to say, by grasping the handle and inserting the universal joint through the bushing 14, it is substantially impossible to manipulate the handle in such a way as to cause the lower end of the universal joint to be inserted in the roll-back 6b. The use of rod 38, shown in Fig. 2, is therefore particularly important, and by employing this rod, this assembly can be made very quickly.

In Fig. 14, the latch mechanism 2a is mounted in the door at right angles to the angularly positioned handle shaft 10b. This places the face of bolt 5 at an angle to the vertical, but that is unobjectionable, particularly in doors for open cars. The angularity of shaft 10b is such as to produce the desired outward swinging movement of the hand-grasp when the handle is turned to release the latch. The space immediately beneath the inclined latch mechanism 2a may be converted into a utility pocket, or compartment 54, if desired.

In Fig. 14, the bushing, or escutcheon, 14a is of a form which has been very generally used, and which is secured to the door by means of a pair of screws 55 placed one on either side of the handle. In the other figures of the drawings, an improved form of bushing is employed which is secured in place by flaring the skirt portion 56 after inserting the same through the aperture in the door. This bushing is also provided with suitable resilient packing, as indicated, in order to prevent rattling of the handle, to facilitate the assembly of the handle and latch mechanism and to keep out dust and water.

Figure 15:
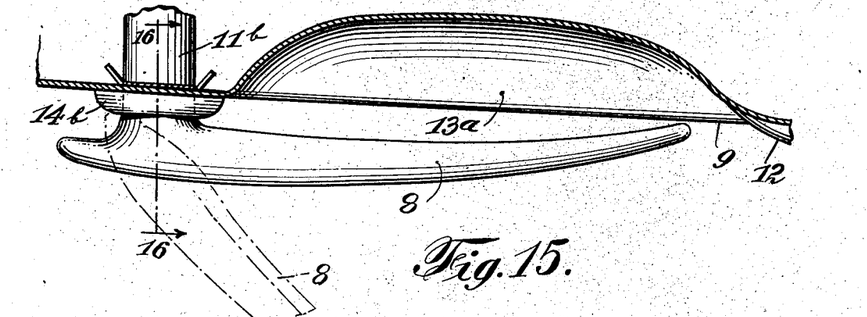
Fig. 15 represents a view similar to Fig. 1 of another modification, the section being taken on line 15—15 of Fig. 16.
Figure 16:
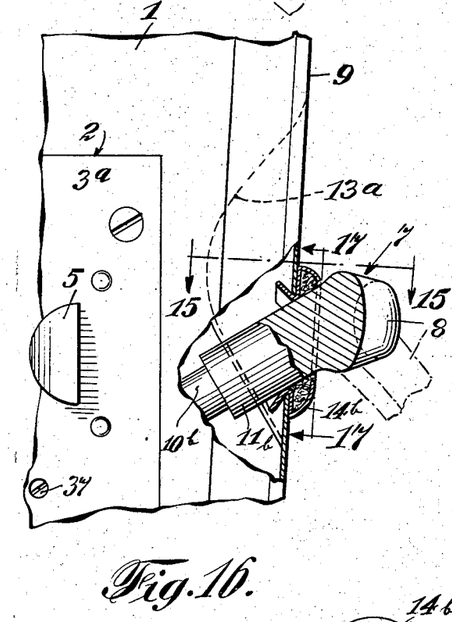
Fig. 16 represents a view partly in elevation and partly in section on line 16—16 of Fig. 15.
Figure 17:
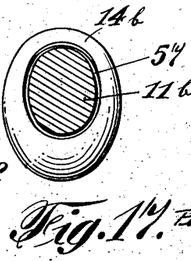
Fig. 17 is a view taken on line 17—17 of Fig. 16.

In Figs. 15 and 16, instead of the aperture through which the handle shank passes being located in the lower angularly disposed surface of a recess, such, for example, as recess 13 of Figs. 1, 2, 6, 13 and 14, this aperture is located in the vertical wall 9, and, if desired, a recess 13a may be provided opposite the hand grasp 8. The aperture 57 through which shank 11b of the handle passes, is elliptical in shape, as shown in Fig. 17, and bushing 14b is consequently also of elliptical formation.

Figure 18:
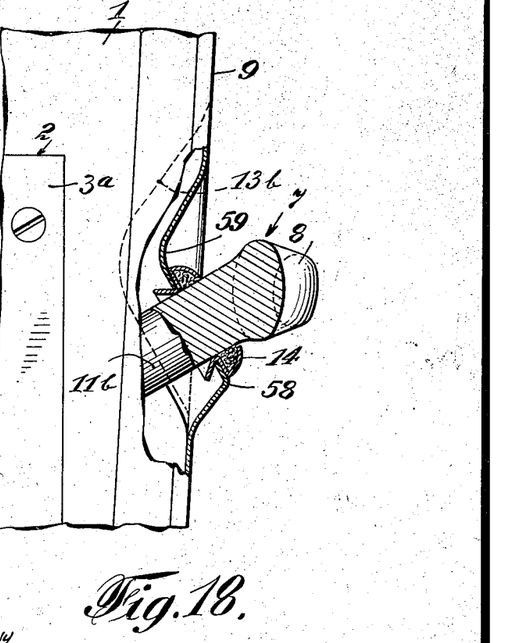
Fig. 18 represents a view somewhat similar to Fig. 16 of another modification.

In Fig. 18, recess 13b opposite the hand-grasp is substantially of the same sort as recess 13a of Fig. 15, although shallower, but the use of an elliptical bushing 14b is eliminated by forming the surface of the door adjacent the handle at right angles to the axis of the handle. This is done by causing the surface of the door adjacent the lower edge of this portion to project outwardly as shown at 58, and the surface adjacent the upper edge of this portion to be depressed slightly, as indicated by numeral 59. This modification has the advantage of a shallower recess opposite the hand-grasp which allows more room for the window and its operating mechanism, or what amounts to the same thing, enables the overall thickness of the door to be decreased.

Figure 15A:
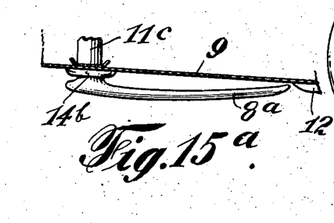
Fig. 15a represents a view somewhat similar to Figs. 1 and 15 of another modification.

Referring now to Fig. 15a, all recesses are here eliminated, and the handle is mounted as close to the surface 9 of the door as possible. In order to reduce to a minimum the extent to which the handle projects from the surface of the car body, the hand-grasp 8a is made exceptionally thin. It will be understood that in side view, the appearance of the hand-grasp conforms as closely as possible to the appearance of bead 12. The handle shaft 10c is given approximately the same degree of angularity with respect to the horizontal and with respect to the surfaces of the door, as is indicated in Figs. 2, 6, 13, 14, etc.

It will be remembered that the spiral spring, shown in dotted lines in Fig. 4, causes the handle to be retained in horizontal position whenever it is not turned away from this position by the hand. Also, in all latch mechanisms there is always a certain amount of lost motion, so that the handle 8a must be turned through a fairly considerable angle before it commences to retract the latch bolt 5. During this movement, very little pressure is required on the handle, and hand-grasp 8a may very conveniently be manipulated by placing the thumb opposite the end of the handle shaft and the ends of the fingers on the hand-grasp. Then as the hand-grasp moves laterally away from the surface 9 of the door, on account of the angularity of shaft 10c, the fingers will automatically slip around the handle and the hand will grasp the same firmer for the purpose of exerting the pressure necessary to retract the bolt. If desired, the latch mechanism may be provided with additional lost motion in order to permit the hand-grasp to move farther away from the body before it begins to move the bolt.

Figure 19:
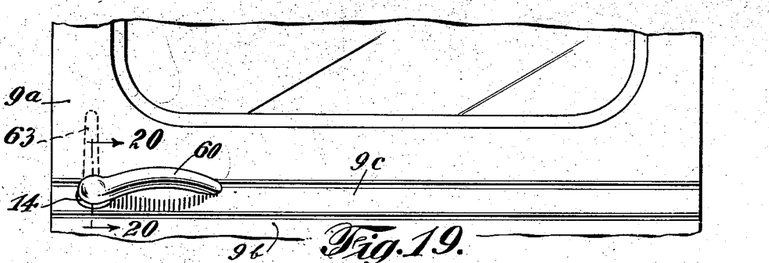
Fig. 19 represents a fragmentary side elevation of an automobile door having different configuration from the door shown in Fig. 3, and to which the handle of my invention has been applied.
Figures 20, 21, 22, 23:
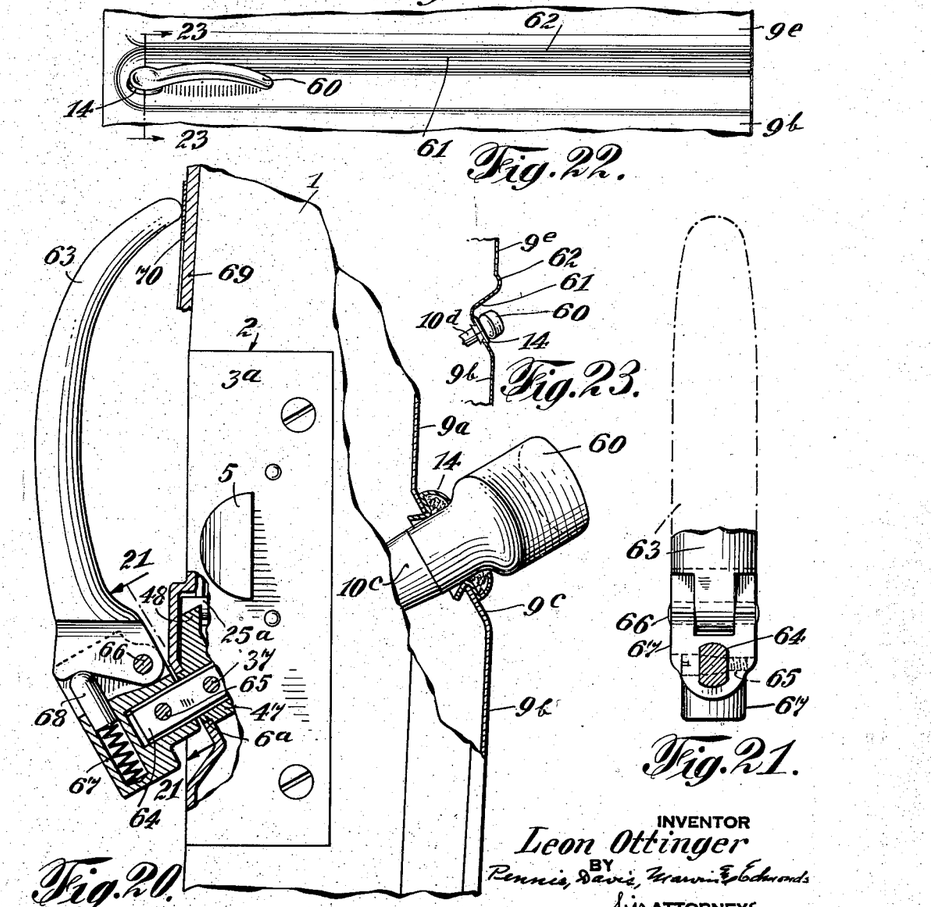
Fig. 20 represents a view partly in elevation and partly in section taken on line 20—20 of Fig. 19.
Fig. 21 is a sectional view taken on line 21—21 of Fig. 20.
Figs. 22 and 23 are views of a still further modification, Fig. 23 being a section taken on line 23—23 of Fig. 22.

In the modified form of the invention shown in Figs. 19 and 20, the upper portion of the door is made thinner than the lower portion, the upper part of the outer surface 9a being connected with the lower part 9b by a sloping portion 9c. The angle of this sloping portion is chosen to give the desired angularity to the handle shaft 10d.

By this arrangement, the handle 60 does not project unduly beyond the lower surface 9b, and the hand-grasp is as freely accessible as in the customary fully projecting type of handle.

A modification of this idea is illustrated in Figs. 22 and 23, wherein the handle 60 is substantially flush with both the lower surface 9b and the upper surface 9e, this upper surface being in the same plane as the lower surface 9b. In other words, in this arrangement, a longitudinal groove 61 extends horizontally of the door, and, if desired, may extend to the next door, and partly or entirely around the remainder of the car body. As shown in Fig. 22, the forward end of this groove terminates at handle 60. With such a groove formation, the angular shaft 10d may be brought out at right angles to the lower surface of the groove, and ample space is provided above the handle hand-grasp. If desired, a decorative bead 62 may be added along the upper edge of groove 61.

Referring now to Figs. 20 and 21, there is here shown a handle 63 for the inside of the door which is somewhat similar to the handles previously described for the outside of the door. The latch mechanism 2, shown in Fig. 20, is the same as the latch mechanism shown in Fig. 4, and handle 63 is mounted upon an extension 64 of the handle shaft 10d by means of a threaded, and preferably tapered, pin 65 similar to tapered pin 37.

It is desirable to arrange handle 63 so that it will extend upwardly rather than downwardly, in order that it may be reached conveniently, and the upper end of handle 63, therefore, tends to move inwardly against the inner surface of the door, as the outside handle 60 is turned to release the latch bolt 5. For this reason, the lower end of handle 63 is pivoted at 66 to a hub member 67. The handle is held yieldingly in the upright position by means of a spring pressed plunger 68 suitably mounted in hub 67. In order to protect the upholstery 69, a wearing plate 70, preferably of metal, is mounted on the surface of the upholstery, and the end of handle 63 slides over this wearing plate as the handle is turned.

It will be understood that with some forms of my invention, such, for example, as shown in Figs. 6, 7, 13 and 23, should it be desired to lock the car by means of a key, a separate pillar lock will be installed on one door, and on the other doors the customary remote control locking device, or other locking device, may be used.

It is desirable, although the handle shank, or shaft, of my improved handle is arranged at a decided oblique angle with respect to the outside surface of the door, that the handle appear to have a shank which enters the door at right angles to the surface of the door when the forms of my invention shown in Figs. 15, 15ª or 16 are employed. For this purpose I give the hand clasp portion 8 of my improved handle a flattened cross section as shown in Fig. 16, and the major axis of this elliptical or flattened cross section is arranged substantially parallel with the surface 9 of the door so that a plane passing through or parallel with this major axis is located at a decided angle to the axis of the shank, or shaft portion. In addition, as shown in Figs. 1, 2, 15, 15ª, 16 and 18, the handle is so arranged that the shank, or shaft portion, protrudes as little as possible beyond the surface of the car door, or the escutcheon 14, and this portion is concealed to a large extent, especially when viewed from a short distance in front of the handle, by means of the protuberance at the bottom of the handle immediately adjacent the shank portion 11b, as shown particularly in Fig. 16. It is desirable to make the lower protuberance project even more than shown in Fig. 16 so as to bring the bottom of this protuberance below the point where the shank portion 11b enters the escutcheon 14b, since in this way the angular shank is most completely concealed, it being impossible to discern that the shank does not project straight into the door at right angles.

My improved lock and handle mechanism is intended for use on doors of various sorts, such as the doors of motor cars, railway cars, airplanes and also on doors of stationary apparatus, such, for example, as refrigerators, storage cupboards and compartments, etc. In fact the improved lock and handle may be used wherever it is desired to provide an opening handle which is comparatively unnoticeable but which can be operated with ease, and it will be understood that the term "door", as used in the appended claims, is intended to include drawers and the like, and closures generally, to which the improved handle may be suitably applied.

As a door handle for automobiles, however, the invention possesses particularly attractive possibilities. There is a need in this field for a door handle which is adapted for use on streamlined car bodies, but which will not necessitate great expense in changing the tool equipment in present use for the manufacture of the latch mechanisms and the escutcheon or bushing. Moreover, the handle should be capable of adoption without necessitating an increase in the thickness of the car doors, and it should also not necessitate radical changes in the tools now employed for stamping sheet metal doors. My present invention fills this need to a remarkable degree. The door handle is so arranged that it does not substantially interfere with streamline flow over the car body. It does not require an increase in the thickness of the door, but by the simple modifications in the latch mechanism which are a part of the present invention, the same freedom is given to the designer to provide for window-actuating mechanism as in doors as at present constructed. It should not require expensive changes in the door construction.

What is claimed is:

1. In a latch mechanism for a door, a latch member, a rotary actuating shaft therefor terminating at a side face of the door, an operating handle normally lying close to and substantially parallel with said side face of the door, one end of the handle being connected with said actuating shaft, the said shaft being disposed obliquely to said side face of the door, thereby causing the free end of the handle to move well away from said side face of the door as the handle is turned to actuate the latch mechanism.

2. In a latch mechanism for a door, a latch member having a rotary actuating member whose axis is disposed obliquely to the plane of the door, and a door handle normally lying close to and substantially parallel with said side face of the door, the door handle having a shaft to which it is attached at one end, said shaft extending through the surface of the door in alinement with the axis of the rotary actuating member and connected thereto to actuate the latching mechanism, the obliquity of said shaft causing the free end of the handle to move well away from the surface of the door as the handle is turned to actuate the latch mechanism.

3. In a latch construction for a door, a latch mechanism mounted thereon at an oblique angle to a side face of the door, a door handle having a shaft secured thereto at one end, said shaft being arranged at an angle of approximately 90° to the latching mechanism and operatively connected therewith to actuate the latch mechanism by rotary movement, the handle being substantially parallel to said side face of the door when the latch mechanism is in normal condition, and the free end of the handle swinging well away from the side face of the door as the handle is turned to actuate the latch mechanism.

4. In a latch mechanism for a door, a latch bolt, a rotary actuating member and mechanism interconnecting the latch bolt and the rotary actuating member so that rotary movement of the actuating member causes the retracting of the latch bolt, said interconnecting mechanism having lost motion, and a door handle having a hand-grasp normally positioned close to a side face of the door, the door handle having a shaft extending obliquely to the plane of the door and connected to the rotary actuating member, the obliquity of the shaft being such that the lost motion of the latching mechanism permits the handle to move away from the surface of the door a sufficient distance to allow the hand to obtain a firm grasp upon the handle before commencing to retract the latch bolt.

5. In a latch mechanism for a door, a latch member, an operating shaft therefor arranged obliquely with respect to the plane of the door with its axis in a vertical plane which is substantially perpendicular to the plane of the door, and a handle on said shaft so disposed that when it is turned to actuate the latch mechanism the outer end thereof tends to move toward the surface of the door, said handle having a mounting including a resilient connection to permit the handle to move substantially in a single plane.

6. In a latch mechanism for a door, a latch member, an operating shaft for said member, and means for rotatably mounting said shaft upon the door structure with one end of said shaft terminating approximately in the plane of one side face of the door, said end of the shaft having an operating handle projecting at an angle therefrom in substantially parallel relation to said door face and in close proximity thereto and said shaft having its axis of rotation positioned obliquely to said door face so as to cause the free end of said handle to move in an arcuate path well away from the door face when said handle is operated to rotate the shaft and actuate the latch member.

7. In a latch mechanism for a door, a latch member, a rotary operating shaft for said member, having one end thereof terminating at one side face of the door, a handle fixed adjacent one end to said shaft and in the normal condition of the latch mechanism extending therefrom in close proximity to said door face, said shaft being mounted in an oblique position on the door and having its axis disposed in a vertical plane which is substantially perpendicular to said door face whereby when the handle is moved from its normal position it is caused to swing well away from the face of the door.

8. In a latch mechanism for a door, a latch member, an actuating shaft for said latch member extending obliquely downwardly from one side face of the door, and having an operating handle angularly projecting from one end of the shaft over and in close proximity to said side face of the door, said shaft having an axis of rotation disposed in a vertical plane which is substantially perpendicular to said door face, whereby rotation of said shaft by movement of said handle, to actuate the latch member causes the free end of the handle to move in an arcuate path well away from the door face.

9. In a latch mechanism for a door, a latch member, mounted on one side of the door, an operating handle at the opposite side of the door, a rotatable member, and means operatively connecting said handle with said rotatable member, said means including an actuating shaft rotatably mounted in said opposite side of the door and rigidly connected to said handle near one of its ends, said end of the handle and said rotatable member being out of transverse alignment, said handle in the normal condition of the latch mechanism projecting from said shaft over one side face of the door in close proximity thereto and the axis of said shaft being positioned relative to the plane of the door face whereby in the rotation of said shaft to actuate the latch member, the free end of said handle moves through an arcuate path well away from the door face.

10. In a latch mechanism for a door, a latch member, an operating shaft connected thereto at one of its ends and positioned obliquely to one side face of the door and an operating handle rigidly connected with the other end of said shaft, projecting at an angle therefrom, and having a major cross-sectional dimension disposed in a plane which intersects the axis of said shaft at an angle of less than 90°.

11. In door latch mechanism, a roll-back, a housing in which said roll-back is rotatable, and means for mounting said roll-back housing upon a door structure with the axis of rotation of the roll-back inclined transversely of said door structure.

12. In door latch mechanism, a roll-back, a housing in which said roll-back is rotatable, and means for mounting said roll-back and housing upon a door structure with the axis of rotation of the roll-back inclined transversely of said door structure and disposed in a vertical plane which is substantially perpendicular to one side face of the door.

13. In door latch mechanism, a roll-back and means for mounting said roll-back upon a door structure with its axis of rotation inclined transversely of said door structure, and said roll-back having a radially projecting bolt-retracting nose coacting with a part of the latch mechanism and normally lying in a plane substantially parallel to one side face of the door.

14. In door latch mechanism, a base plate adapted to be secured to a door structure, a roll-back, a housing in which said roll-back is rotatable, mounted upon one side of said base plate, the roll-back being mounted in said housing with its axis of rotation positioned obliquely and disposed in a vertical plane substantially perpendicular to the plane of said base plate.

15. In door latch mechanism, a base plate adapted to be secured to a door structure, a roll-back, and means for rotatably mounting said roll-back upon one side of said base plate with its axis of rotation positioned obliquely thereto, said means including an angularly offset part of said base plate constituting a bearing for the roll-back.

16. In door latch mechanism, a base plate adapted to be secured to a door structure, a roll-back, and means for rotatably mounting said roll-back upon one side of said base plate with its axis of rotation positioned obliquely thereto, said base plate having an offset part forming a recess, and said roll-back having a radially projecting nose positioned in said recess and movable in the plane of said base plate.

17. In door latch mechanism, a base plate adapted to be secured to a door structure, a roll-back, and means for rotatably mounting said roll-back upon one side of said base plate with its axis of rotation positioned obliquely thereto, said base plate having an offset part forming a recess, and a part of said roll-back and a coacting part of the latch mechanism being movable within said recess.

18. A bolt-retracting roll-back for door latch mechanism having a rotatable body provided with a bolt-retracting nose deflected at an acute angle from a median plane through the body of the roll-back and normal to its axis.

19. In door latch mechanism, latch bolt retracting means adapted to be mounted adjacent the inner side of the door, actuating means for said retracting means including an operating handle at the outer side of the door normally lying in substantially parallel relation to the outer face of the door and in close proximity thereto, and connecting means between said handle and part of the retracting means whereby the handle may be operated to retract the latch bolt, said connecting means being arranged so that when the handle is operated it swings outwardly away from the face of the door about an axis inclined to the face of the door.

20. In door latch mechanism, latch bolt retracting means adapted to be mounted adjacent the inner side of the door including a rotary actuating member, an operating handle at the outer side of the door, close to and substantially parallel with the outer face of the door in the normal condition of the latch mechanism, and arranged at an angle of approximately 90° to the axis of said actuating member, said handle being operatable to actuate said member by manual force applied thereto in a plane substantially parallel with said door face, and means operatively connecting said handle at one of its ends with said actuating member, the other end of said handle swinging away from said door face in an arcuate path at an angle relative to the direction of manual pressure against said handle as the handle is operated to actuate said member and retract the latch bolt.

LEON OTTINGER.

CERTIFICATE OF CORRECTION.

Patent No. 2,075,829.  April 6, 1937.

LEON OTTINGER.

It is hereby certified that error appears in the above numbered patent requiring correction as follows: At the top of page 1 of the printed specification, for "Reissued Apr. 6, 1937" read Patented Apr. 6, 1937; and that the said Letters Patent should be read with this correction therein that the same may conform to the record of the case in the Patent Office.

Signed and sealed this 27th day of February, A. D. 1940.

(Seal)

Henry Van Arsdale,
Acting Commissioner of Patents.